Dec. 19, 1961 W. SELL 3,013,846
PACKING FOR SEALING MOVABLE-SHAFTS
Filed Nov. 27, 1959
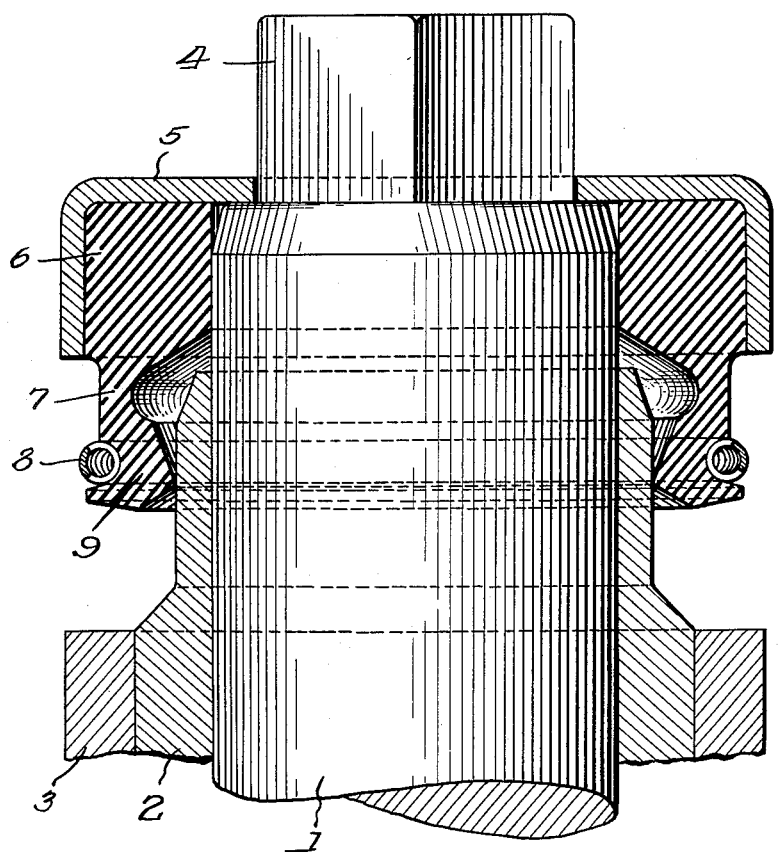
Inventor.
Werner Sell.

United States Patent Office 3,013,846
Patented Dec. 19, 1961

3,013,846
PACKING FOR SEALING MOVABLE SHAFTS
Werner Sell, Opladen, Germany, assignor to Goetzewerke Friedrich Goetze Aktiengesellschaft, Burscheid, near Koln, Germany, a corporation of Germany
Filed Nov. 27, 1959, Ser. No. 855,852
Claims priority, application Germany Dec. 4, 1958
1 Claim. (Cl. 308—36.1)

This invention is concerned with a packing for sealing movable shafts, particularly a vertically extending operating or drive shaft of a washing machine.

A vertically positioned drive shaft extending through a stationary standpipe of a washing machine is sealed against its environment so as to prevent seepage of liquid, rising above the standpipe, into the shaft journal means. Shaft packings customarily used for this purpose before, were provided with a packing member drawn over the stationary standpipe and having a sealing lip engaging the drive shaft in intimate engagement therewith, the sealing lip facing in the direction of the chamber containing the washing liquid. Accordingly, after draining the machine, liquid residue could accumulate between the drive shaft and the sealing lip, such residue upon drying firmly adhering to the shaft owing to the soap content of the washing liquid. Moreover, the drive shaft is usually made of ordinary steel which is subject to rusting, causing premature destruction of the shaft packing.

In order to avoid these disadvantages, the invention proposes to arrange the packing body and/or the casing therefor, fixedly upon the shaft which is to be sealed. Accordingly, the packing will rotate with the drive shaft or partake in the rotary oscillating motion thereof. The sealing lip is arranged so as to embrace either the standpipe or a guide bushing fixedly secured to the standpipe and serving as a journal or bearing for the drive shaft. The use of the guide bushing as a part in the sealing of the drive shaft is advantageous because guide bushings of this type are usually made of bronze and therefore avoid trouble that may result from rusting and the like. The sealing lip is in such arrangement disposed so as to face in the direction of the chamber containing the liquid, thus permitting all liquid to run off therefrom upon draining the machine, thereby avoiding retention of liquid residue between the sealing lip and the journal surface cooperating therewith.

A wall of the casing for the packing has a polygonal opening formed therein for receiving a similarly shaped part of the drive shaft, for example, a square part, upon which the casing of the packing is mounted.

An embodiment of the invention will now be described with reference to the accompanying drawing showing a packing seal applied to a vertically extending drive shaft.

Referring now to the drawing, numeral 1 indicates the drive shaft which is rotatably journalled in the stationary guide and journal or bearing bushing 2, such bushing being fixedly mounted within the standpipe 3. The drive shaft 1 carries at the free end thereof an extension 4 of square configuration for mounting thereon the casing 5 for the packing, such casing having a transverse wall in which is formed an opening of corresponding configuration. The annular elastic packing body 6 contained within the housing 5 is in known manner vulcanized thereto and is with part of its inner surface in firm and intimate static sealing engagement with the drive shaft 1. From the corresponding part of the packing body 6 extends a connecting portion or web 7 which is integral therewith and terminates in annular part 9 constituting the sealing lip. A spring 8 is provided for biasing the sealing lip 9 radially inwardly to maintain the sealing lip in flexible sealing engagement with the stationary guide and journal bushing 2.

Changes may be made within the scope and spirit of the appended claim which defines what is believed to be new and desired to have protected by Letters Patent.

I claim:

In combination with a movable shaft of a washing machine and the like, wherein said shaft is rotatably journalled within a tubular relatively stationary bearing bushing and extends vertically upwardly from such bushing, a device for sealing said shaft against seepage of liquid into said bearing bushing, said device comprising a circular cross-sectionally generally U-shaped metallic casing surrounding an upper part of said shaft in the manner of an inverted cup and removably keyed directly to said shaft at the free upper end of the latter for rotation therewith, the side wall of said casing extending axially of said shaft radially spaced therefrom and forming an annular space therewith, an annular cross-sectionally substantially cylindrical elastic packing body contained in said casing in firmly adhering engagement with the inner walls thereof and substantially filling said space, the inner wall of said packing body surrounding said upper part of said shaft in intimate static sealing engagement therewith, a tubular extension which is integral with said packing body projecting downwardly therefrom free of said casing in overlapping relationship with respect to the upper end of said bearing bushing, said extension being interiorly radially recessed to form a free annular space surrounding the upper part of said bearing bushing and terminating at its lower end in a sealing member forming an elastic annular radially inwardly directed lip embracing said stationary bearing bushing in flexible sealing engagement therewith, and a spring disposed in an annularly extending groove formed in said sealing member for constricting such member radially inwardly to hold said sealing lip in flexible sealing engagement with said stationary bearing bushing.

References Cited in the file of this patent

UNITED STATES PATENTS

| | | |
|---|---|---|
| 645,873 | Sebring | Mar. 20, 1900 |
| 2,272,526 | Keeran | Feb. 10, 1942 |
| 2,671,408 | Kreitchman | Mar. 9, 1954 |
| 2,760,802 | Haley | Aug. 28, 1956 |
| 2,916,896 | Miller | Dec. 15, 1959 |